United States Patent [19]

Dapo

[11] Patent Number: 4,835,660
[45] Date of Patent: May 30, 1989

[54] USE OF CHOLINE AS THE CATION IN CAPACITOR FOR ELECTROLYTES

[75] Inventor: Roland Dapo, Columbia, S.C.

[73] Assignee: North American Philips Corporation, New York, N.Y.

[21] Appl. No.: 210,060

[22] Filed: Aug. 15, 1988

[51] Int. Cl.$^4$ .............................................. H01G 9/00
[52] U.S. Cl. ................................. 361/504; 252/62.2
[58] Field of Search ................ 252/62.2; 361/433 E; 29/570.1

[56] References Cited

U.S. PATENT DOCUMENTS

| | | | |
|---|---|---|---|
| 4,373,176 | 2/1983 | Finkelstein et al. | 361/433 E |
| 4,715,976 | 12/1987 | Mori et al. | 252/62.2 |
| 4,762,633 | 8/1988 | Shinozaki et al. | 252/62.2 |
| 4,774,011 | 9/1988 | Mori et al. | 252/62.2 |

*Primary Examiner*—Donald A. Griffin
*Attorney, Agent, or Firm*—Norman N. Spain

[57] ABSTRACT

Improved electrolytes for electrolytic capacitors contain a choline salt of aromatic dicarboxylic acids or tetracarboxylic acids, cis-aliphatic and cis-alicylic dicarboxylic acids and tetracarboxylic acids in a mole ratio of choline to carboxylic groups of 1 to 2 and an aprotic solvent.

15 Claims, 4 Drawing Sheets

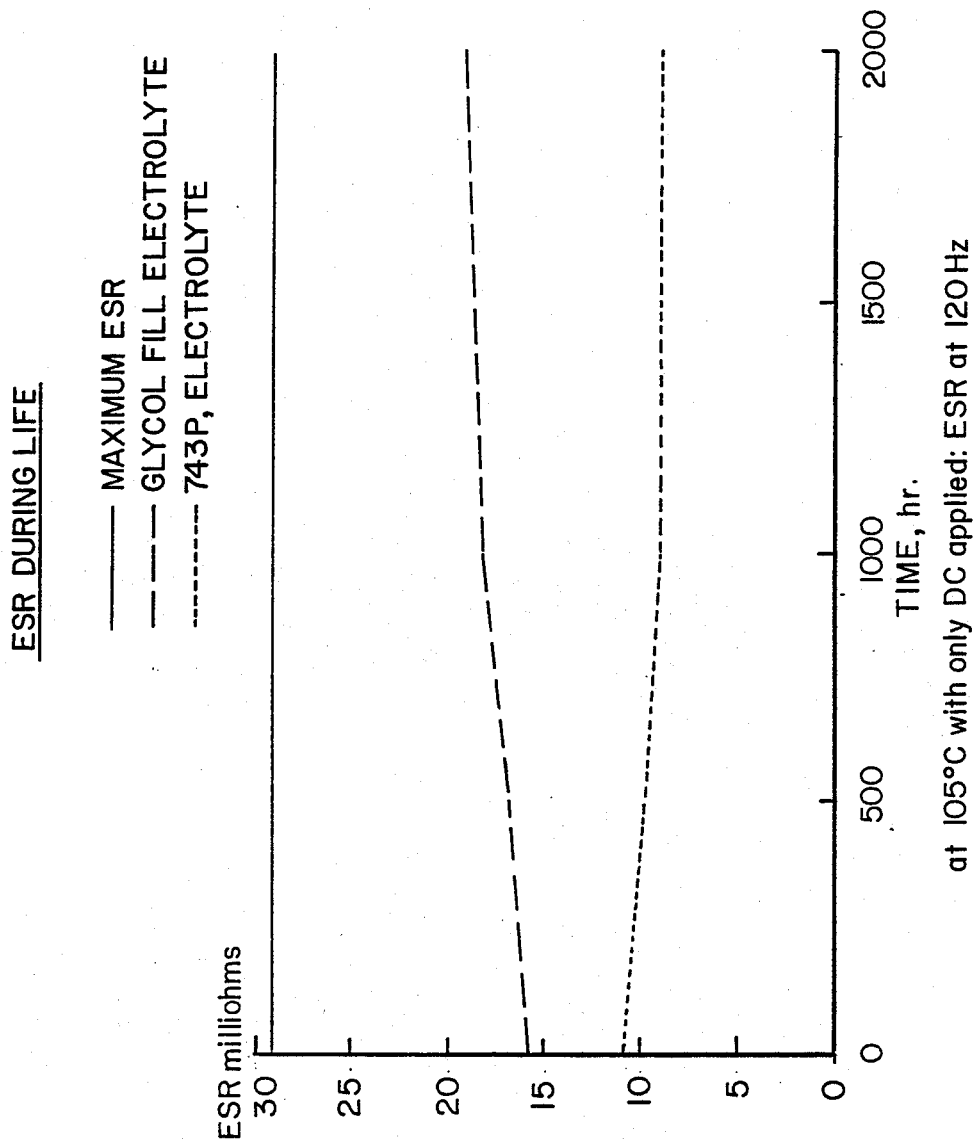

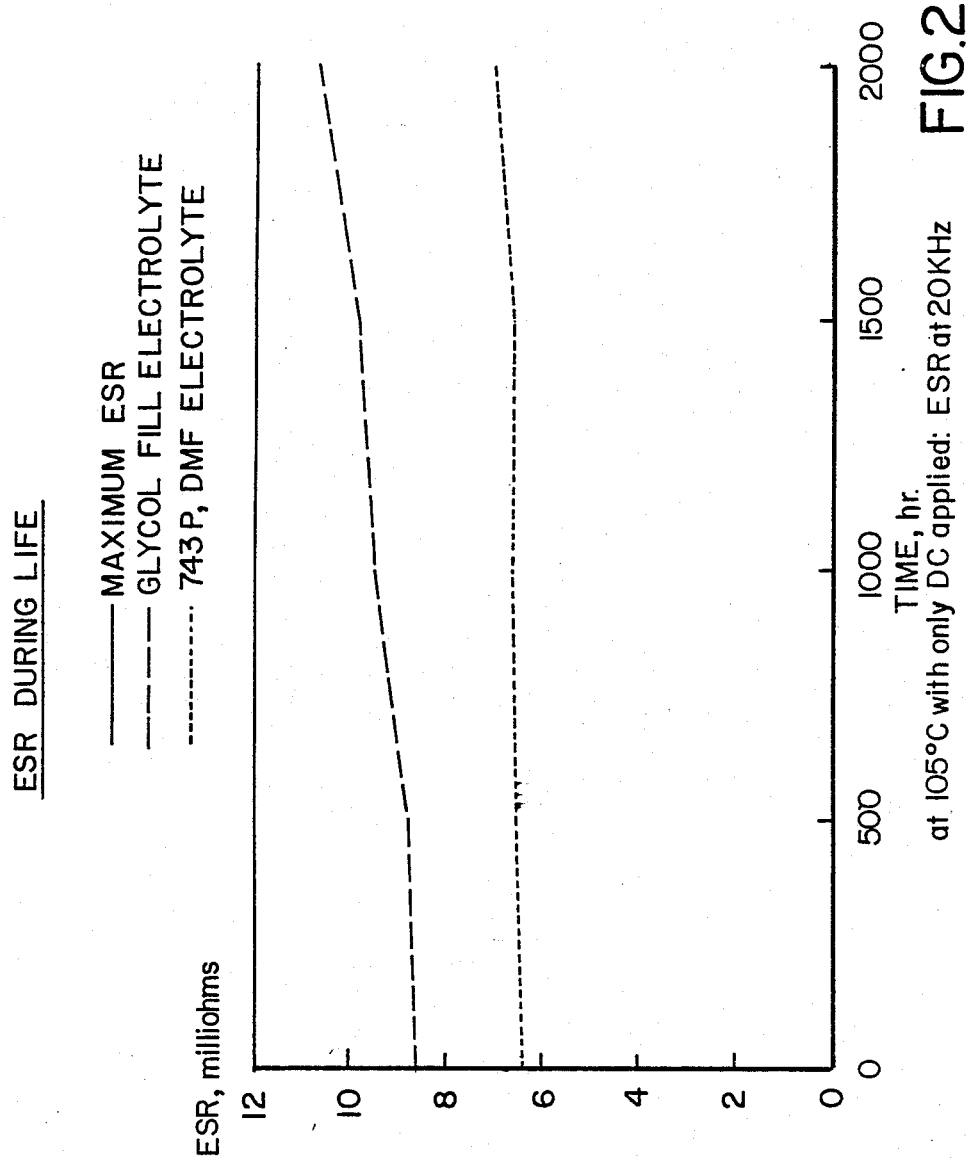

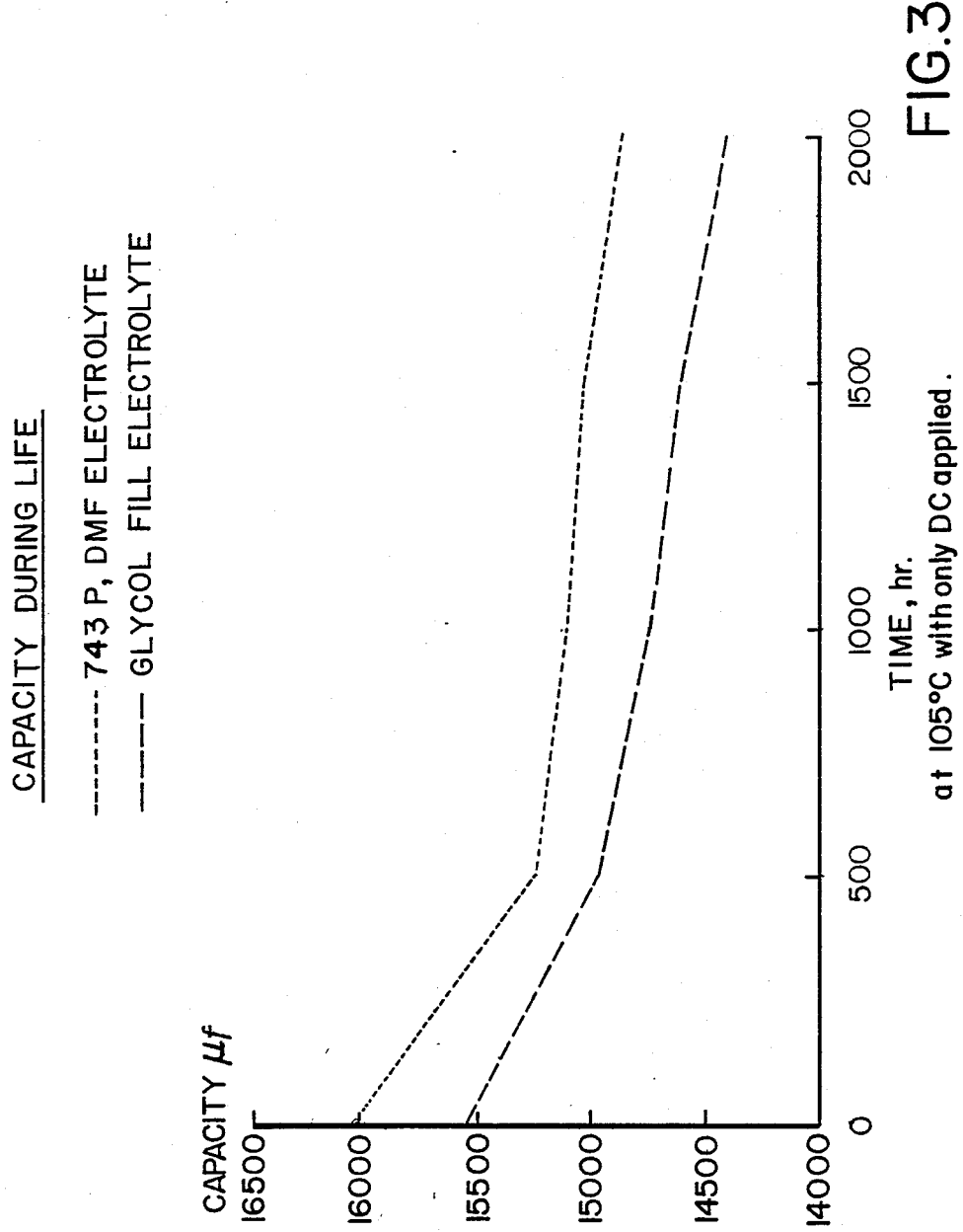

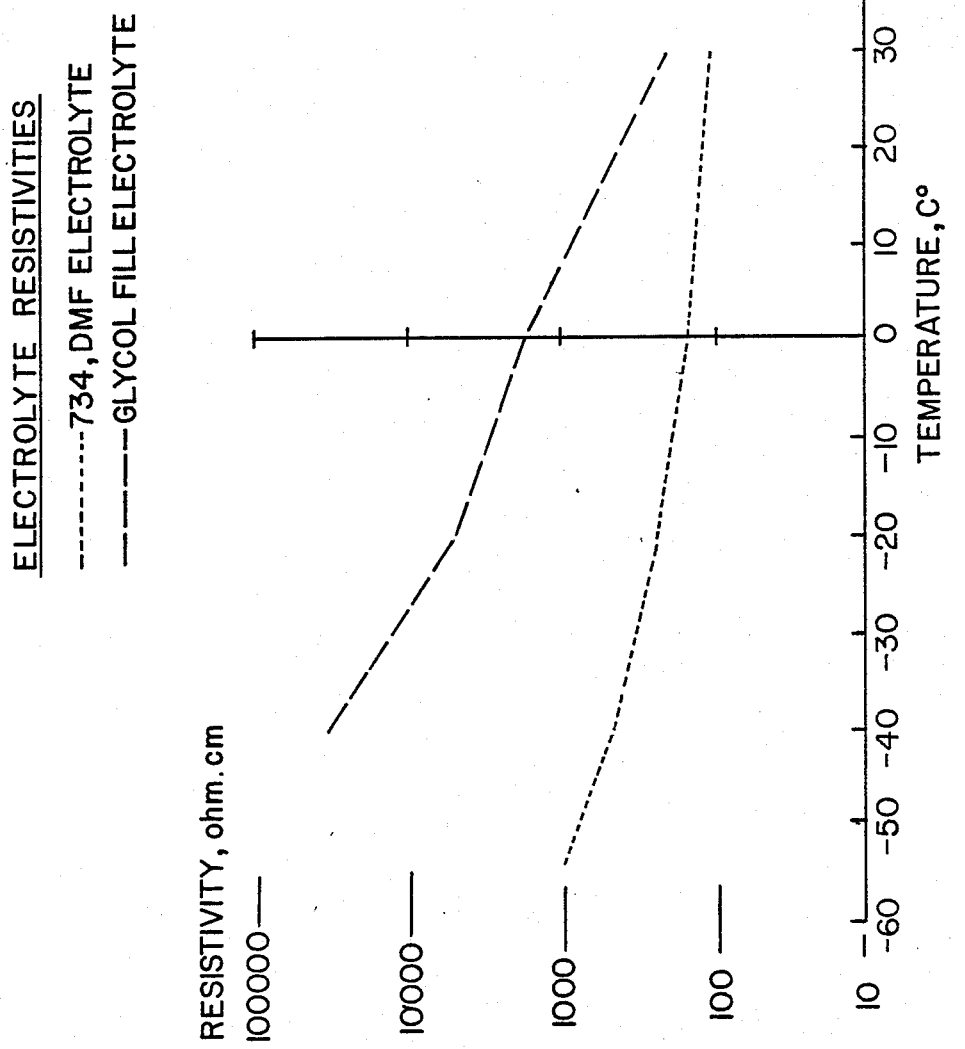

USE OF CHOLINE AS THE CATION IN CAPACITOR FOR ELECTROLYTES

BACKGROUND OF THE INVENTION

The invention in this case relates to a new and novel electrolyte particularly adapted for use in electrolytic capacitors and to capacitors containing this electrolyte.

It is desirable that electrolytes employed for capacitors be as safe as possible. Additionally it is desirable that the electrolyte not contain an alkali metal as the alkali metal tends to be reduced during operation of the capacitor and during this reduction tends to cause pitting of aluminum cathodes. Further, the electrolyte should be free of halides as the presence of halides tends to deteriorate the capacitors.

Additionally, for those capacitors to be used under operating conditions of high temperatures for example at about 125° C. it is desirable that the vapor pressure of the electrolyte be as low as possible at these temperatures. This is particularly desirable when the capacitors employed are tantalum capacitors as these capacitors are frequently operated for long periods of time at high temperatures.

Ross, U.S. Pat. No. 2,759,132, shows tantalum and aluminum electrolyte capacitors containing as an electrolyte a quaternary amine salt of an oxidizing anion such as one having a nitro, nitrosa or other oxidizing substituent. Other Examples of amines disclosed are the salts of tetraethanol ammonium and tri-isopropanol ammonium cations.

Examples of the anions are the picrates, nitrophenolates, nitrophenyl and the nitro-beta-naphtholate. These electrolytes suffer from the disadvantages of being relatively unsafe to those employed in the production process as the anion are toxic and potentially explosive.

Ross, U.S. Pat. No. 2,866,139, shows an electrolytic capacitor in which a tantalum anode is employed and in which the electrolyte contains a salt of an organic amine cation and an aromatic anion possessing a quinoid structure. Examples of the anion disclosed are alizarin, tetrahyroxyquinone and alizalin sapherole B. Among the cations disclosed are the quaternary amines such as the tetraethylammonium and other quaternary amines. While the electrolyte of this patent is useful at high temperatures as the vapor pressure is low at high temperatures, it is not free of halides particularly the chloride. Additionally, the anions employed are so expensive so as to prohibit the large scale use of these electrolytes.

Ross, U.S. Pat. No. 3,300,693, also shows electrolytes for use in an electrolytic capacitor comprising in a tantalum anode and an electrolyte containing a salt of phosphoric acid and a quaternary ammonium cation such as the tetraethylammonium cation. While these electrolytes are useful at high temperatures as they exhibit low vapor pressures at high temperatures they are not free of halides particularly chlorides.

SUMMARY OF THE INVENTION

A principle object of this invention is to provide an electrolyte particularly adapted for use in an electrolytic capacitors such as aluminum electrolytic capacitors or tantalum electrolytic capacitors which are free of halides, have a vapor pressure at temperatures such in the neighborhood of 125° C. allow efficient and long term operation of capacitors containing these electrolytes at these temperatures and which present less hazardous conditions during the manufacturing process.

According to the invention the applicant has developed a new and novel electrolyte. The electrolyte of the invention in its broadest aspect comprises a solution in an aprotic solvent of a salt of choline and an acid selected from the group consisting of the aromatic dicarboxylic acids, the aromatic tetracarboxylic acids, the cis-aliphatic dicarboxylic acids, the cis-aliphatic tetracarboxylic acids, the cis-alicyclic dicarboxylic acids and the cis-alicyclic tetracarboxylic acids, the choline and carboxylic groups being present in the mole ratio of about 1 to 2.

Since the choline may be manufactured without the use of halides, the electrolytes are free of chlorine, unlike most of the quaternary salt ammonium compounds formerly employed. Additionally, choline is a safe non-toxic material, in fact being a vitamin.

Further, the electrolyte of the invention has a relatively low vapor pressure at high temperatures making it particularly adapted for use in tantalum electrolytes designed to be used for long periods of time at high operating temperatures.

It should be noted that German Pat. No. 563,994 shows an electrolyte, for a capacitor, containing licithin as an emulsifying agent.

Licithin is a mixture of the diglcerides of stearic, palmetic, oleric or other fatty acid linked to the choline ester of phosphoric acid.

BRIEF DESCRIPTION OF THE DRAWINGS

In the drawing,

FIG. 1 is a graph showing change in ESR (equivalent series resistance) plotted against time of a capacitor that contains the electrolyte of the invention as compared to a capacitor employing a prior art electrolyte.

FIG. 2 is a graph showing the change in ESR also plotted against of the time but measured at a different frequency for these capacitors.

FIG. 3 is a graph showing the change in the capacitance with time of these capacitors.

FIG. 4 is a graph showing the relationship of low to moderate temperature to the resistivity of an electrolyte of the invention and a standard electrolyte.

DETAILED DESCRIPTION OF THE INVENTION

While the electrolyte of the invention may comprise a salt of choline and an acid selected from the group consisting of the aromatic dicarboxylic acids, the tetracarboxylic acids, the cis-aliphatic dicarboxylic and tetracarboxylic acids and the cis-alicyclic dicarboxylic and tetracarboxylic acids it has been found that superior results are obtained with the choline salts of an acid of the group consisting of ortho-phthalic acid, maleic acid, hexahydrophthalic acid and pyromellitic acid and that particularly useful particular excellent results have been obtained with the choline half salt of O-phthalic acid.

While any aprotic solvent may be employed as the solvent for the electrolytes of the invention, particularly useful are: dimethylformamide, dimethylacetamide, butyrolactone and dimethylsulfoxide. These solvents may be used individually or in mixtures. Preferably a mixture of dimethylformamide in a major amount and another of the aprotic solvents in a minor amount is employed. In addition, the electrolyte may contain a protic cosolvent such as water or a glycol for example ethylene glycol in an amount of up to 25% by weight.

Further, a small amount of phosphoric acid, an amount of up to 0.1% by weight may be employed in order to ensure cathode passivation.

Electrolytes consisting essentially of a solution of about 3.0–25.0 weight % of the choline salt, about 23.0–96.8 weight % of a aprotic solvent, up to 25% by weight of the aprotic cosolvent with the addition of up to 0.1% by weight of phosphoric acid have been found to be highly useful and especially preferred are electrolytes consisting essentially of about 70.8% of dimethylformamide, 12 weight % of butrolactone, about 13.0–15.0 weight % of the choline half ester of phthalic acid, about 0.005–0.02% by weight of phosphoric acid and the remainder water and electrolytes consisting essentially of about 70 weight % of dimethylformamide, 12 weight % of dimethylacetamide, about 13.0–15.0 weight % of the choline half salt of phthalic acid, about 0.005–0.02 weight % of phosphoric acid and the remainder water. The novel electrolyte of the invention may be employed with an electrolytic capacitor in which the anode and cathode may be formed of metals known to be employed in such capacitors for example aluminum, tantalum, titanium and niobium.

Preferred embodiments of the invention will now be described with reference to the figures of the drawing and the following examples.

EXAMPLE 1

732K Electrolyte

This electrolyte was made by adding the following chemicals in descending order:

| CHEMICAL | WT % |
| --- | --- |
| Dimethylformamide | 70.00 |
| 85% Phosphoric Acid | 0.01 |
| Phthalic Acid | 8.00 |
| add slowly with vigorous stirring | |
| 70% Choline bicarbonate | 10.00 |
| Butyrolactone | 12.00 |
| Heat to 130 C. and allow to cool | |

EXAMPLE 2

Electrolyte B

This electrolyte was made by adding the following chemicals in descending order:

| CHEMICAL | WT % |
| --- | --- |
| Dimethylformamide | 70.00 |
| Dimethylacetamide | 12.00 |
| 85% Phosphoric Acid | 0.01 |
| Phthalic Acid | 8.00 |
| add slowly with vigorous stirring | |
| 70% Choline bicarbonate | 10.00 |
| Heat to 130 C. and allow to cool | |

The initial properties of these electrolytes and a standard glycol electrolyte are shown in the following table:

TABLE I

| PROPERTY | 732K | 743P | GLYCOL |
| --- | --- | --- | --- |
| 10% pH | 4.22 | 4.26 | 6.00 |
| 100% pH | 7.46 | 7.55 | 7.50 |
| Scintillation V Res. ohmcm, | >72 | >70 | >100 |
| 30 C. | 101.4 | 100.9 | 145. |
| −20 | 256 | 264 | 5,230 |
| −40 | — | 502 | 31,500 |
| −55 | 899 | 1085 | — |

As it will be noted the properties of the electrolytes of the invention improved results particularly in regard to resistivity at low temperatures.

In order to evaluate the electrolytes for use in capacitors aluminum electrolyte capacitors comprising aluminum foil anodes and aluminum foil cathodes separated by a Manila paper impregnated by the electrolytes of the invention and the standard glycol electrolyte were manufactured and tested as follows.

The capacitors where subjected to a DC operating life test which was carried out in the 105° C. oven. The capacitors were removed every 500 hours from the oven and cooled to room, temperature readings were then made on each of the capacitors which were then returned to high temperature conditions. The performance of the various electrolytes are compared in the following graphs.

In FIG. 1 the change in the ESR at 120 Hz is plotted against time, and FIG. 2 the change of the ESR at 20,000 Hz is similarly plotted against time. In both cases it is shown that the capacitors which contained the 743P composition were very stable over a considerable period of time and more stable than the capacitors employing the standard glycol electrolyte. In FIG. 3 the change in capacitance with time in capacitors at 105° is shown. As shown in this figure capacitance of the capacitors containing the electrolyte of the invention (743P) is significantly more stable. The shelf life of the capacitors employing 743P electrolytes of the invention as compared to the capacitors containing the standard glycol fill electrolyte are shown in the following table:

TABLE II

| Time Hr. | I1 (5) ma | I1 (10) ma | SHELF FACTOR | Cap uF | ESR 120 Hz | ESR 20 KHz |
| --- | --- | --- | --- | --- | --- | --- |
| 743P ELECTROLYTE | | | | | | |
| 0.0 | 0.060 | 0.036 | — | 16,735 | 10.1 | 6.59 |
| 100 | 0.046 | 0.029 | 1.01 | 16,132 | 9.6 | 6.45 |
| 250 | 0.042 | 0.027 | 0.94 | 16,051 | 9.6 | 6.81 |
| GLYCOL ELECTROLYTE | | | | | | |
| 0.0 | 0.061 | 0.039 | — | 17,319 | 12.3 | 9.02 |
| 100 | 0.055 | 0.034 | 1.00 | 16,890 | 12.6 | 11.09 |
| 250 | 0.049 | 0.030 | 1.00 | 16,858 | 12.2 | 8.08 |

These data show that the DMF composition which uses the Choline as the cation (743P) is no more aggressive than is the standard glycol composition.

Finally, the effect of low temperatures on the resistivity of the 734P electrolyte and the glycol fill electrolyte as shown in the FIG. 4. As shown therein the 734P electrolyte exhibits a significantly lower resistivity particularly at low temperatures than that of the glycol fill electrolyte.

While the instant tests have shown the use of the electrolytes of the invention in aluminum electrolyte capacitors the electrolytes of the invention should be equally useful in electrolytes containing tantalum anode.

While the present invention has been described with reference to particularly embodiments thereof it will be understood that numerous modifications can be made by those skilled in the art without actually departing from the scope of the invention.

What is claimed:

1. An electrolyte particularly adapted for use in an electrolytic capacitor comprising a salt of choline and an acid selected from the group consisting of the aromatic dicarboxylic and tetracarboxylic acids, the cis-aliphatic and cis-alicyclic dicarboxylic and tetracarboxylic acids in a mol ratio of about 1 mol of choline to 2 moles of carboxylic groups and at least one aprotic solvent.

2. The electrolyte of claim 1 wherein in additional protic cosolvent is present in an amount of up to 25% by weight.

3. The electrolyte of claim 2 wherein the acid is selected from the group consisting of ortho-phthalic acid, maleic acid, hexahydrophthalic acid and pyromellitic acid.

4. The electrolyte of claim 3 wherein the aprotic solvent is at least one solvent selected from the group consisting of dimethylformamide, dimethylacetamide, butyrolactone and dimethylsulfoxide and the protic cosolvent is selected from the group consisting of water and glycol and mixtures thereof.

5. The electrolyte of claim 4 wherein the salt is present in an amount of about 3.0-25.0 weight percent, the aprotic solvent is present in an amount of from 23.0-96.8 weight percent and the protic cosolvent present in an amount of up to 25.0% by weight.

6. The electrolyte of claim 5 wherein the salt is the choline half salt of O-phthalic acid.

7. The electrolyte of claim 6 wherein up to 0.1 percent by weight of phosphoric acid is present.

8. An electrolyte particularly adaptive for use in an electrolytic capacitor, said electrolyte consisting essentially of about 70 wt. % of dimethylformamide, about 12 wt. % of butyrolactone, about 13.0-15.0 wt. % of the choline half salt of phthalic acid, about 0.005-0.02 wt. % of phosphoric acid and water.

9. An electrolyte particularly adaptive for use in an electrolytic capacitor, said electrolyte consisting essentially of about 70 wt. % of dimethylformamide, about 12 wt. % of dimethylacetamide, about 13.0-15.0 wt. % of the choline half salt of phthalic acid, about 0.005-0.02 wt. % of phosphoric acid and water.

10. An electrolytic capacitor comprising an anode provided with a dielectric oxide layer and a cathode separated by an insulating spacer impregnated with an electrolyte comprising a salt of choline and an acid selected from the group consisting of the cis-dicarboxylic and aliphatic and alicyclic tetracarboxylic acids and aromatic-dicarboxylic and tetracarboxylic acids in a mol ratio of choline to carboxylic groups of about 1 to 2, at least one aprotic solvent and up to 25.0% by weight of a protic cosolvent.

11. An electrolytic capacitor comprising an aluminum anode and a cathode separated by an insulating spacer impregnated with an electrolyte consisting essentially of about 70 wt. % of dimethylformamide, about 12 wt. % of butyolactone, about 13.0-15.0 wt. % of the choline half salt of phthalic acid, about 0.005-0.02 wt. % of phosphoric acid and water.

12. An electrolyte capacitor comprising aluminum anode and cathode members separated by an insulating spacer impregnated with an electrolyte consisting essentially of about 70 wt. % of dimethylformamide, about 12 wt. % of dimethylacetamide, about 13.0-15.0 wt. % of the choline half salt of O-phthalic acid, about 0.005-0.02 wt. % of phosphoric acid and water.

13. An electrolytic capacitor comprising a tantalum anode provided with a dielectric oxide layer and a cathode separated by an insulating spacer impregnated with an electrolyte comprising a salt of choline and an acid selected from the group consisting of the cis-dicarboxylic and aliphatic and alicyclic tetracarboxylic acids and aromatic-dicarboxylic and tetracarboxylic acids in a mol ratio of choline to carboxylic groups of about 1 to 2, at least one aprotic solvent and up to 25% by weight of a protic cosolvent.

14. An electrolytic capacitor comprising a tantalum anode and a cathode separated by an insulating spacer impregnated with an electrolyte consisting essentially of about 70 wt. % of dimethylformamide, about 12 wt. % of butyolactone, about 13.0-15.0 wt. % of the choline half salt of phthalic acid, about 0.005-0.02 wt. % of phosphoric acid and water.

15. An electrolyte capacitor comprising tantalum anode and cathode members separated by an insulating spacer impregnated with an electrolyte consisting essentially of about 70 wt. % of dimethylformamide, about 12 wt. % of dimethylacetamide, about 13.0-15.0 wt. % of the choline half salt of O-phthalic acid, about 0.005-0.02 wt. % of phosphoric acid and water.

* * * * *